United States Patent
Kashyap

(10) Patent No.: US 6,564,313 B1
(45) Date of Patent: May 13, 2003

(54) SYSTEM AND METHOD FOR EFFICIENT INSTRUCTION PREFETCHING BASED ON LOOP PERIODS

(75) Inventor: Asheesh Kashyap, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 18 days.

(21) Appl. No.: 10/028,836

(22) Filed: Dec. 20, 2001

(51) Int. Cl.$^7$ .................................................. G06F 9/38
(52) U.S. Cl. ..................... 712/207; 711/137; 711/204; 711/213; 712/203; 712/205; 712/237
(58) Field of Search ................................. 711/137, 204, 711/213, 167; 712/203, 205, 207, 237

(56) References Cited

U.S. PATENT DOCUMENTS

| | | | |
|---|---|---|---|
| 5,909,566 A | | 6/1999 | Cai et al. |
| 5,941,981 A | * | 8/1999 | Tran ........................... 712/207 |
| 6,173,410 B1 | | 1/2001 | Bondi et al. |
| 6,260,116 B1 | | 7/2001 | Davis et al. |
| 2003/0028694 A1 | * | 2/2003 | Aboulenein et al. ........ 710/107 |

* cited by examiner

*Primary Examiner*—Kevin L. Ellis
*Assistant Examiner*—Jasmine Song

(74) *Attorney, Agent, or Firm*—Conley, Rose & Tayon

(57) ABSTRACT

The invention contemplates a system and method for efficient instruction prefetching based on the termination of loops. A computer system may be contemplated herein, wherein the computer system may include a semiconductor memory device, a cache memory device and a prefetch unit. The system may also include a memory bus to couple the semiconductor memory device to the prefetch unit. The system may further include a circuit coupled to the memory bus. The circuit may detect a branch instruction within the sequence of instructions, such that the branch instruction may target a loop construct. A circuit may also be contemplated herein. The circuit may include a detector coupled to detect a loop within a sequence of instructions. The circuit may also include one or more counting devices coupled to the detector. A first counting device may count a number of clock cycles associated with a set of instructions within a loop construct. A second counting device may count the number of clock cycles remaining in a loop during the last iteration of the loop. The circuit may further include a logic component coupled to the second counting device, such that the logic component may enable/disable the prefetch unit. A method may further be contemplated herein. The method may include detecting when a set of instructions within a last iteration of a loop may be encountered. The method may also include counting a plurality of clock cycles needed to fetch the set of instructions within the loop. The method may enable the prefetch unit when a remaining number of clock cycles substantially equals the number of clock cycles needed to access a memory device.

20 Claims, 5 Drawing Sheets

| | |
|---|---|
| 0 | Loop0: |
| 1 | execute instruction |
| 2 |     Loop1: |
| 3 |     execute instruction |
| 3 |     execute instruction |
| 4 |     Agn1# if loop1 counter > 0 decrement loop counter and goto Loop1 |
| 5 | execute instruction |
| 6 | execute instruction |
| 8 | Agn0 # if loop counter > 0 decrement loop counter and goto Loop0 |
| 9 | execute instruction |
| 10 | execute instruction |

SYSTEM AND METHOD FOR EFFICIENT INSTRUCTION PREFETCHING BASED ON LOOP PERIODS

BACKGROUND OF THE INVENTION

1. Field of the Invention

This invention relates to microprocessor design, and more particularly directed to systems and methods for increasing microprocessor speed through efficient instruction prefetching.

2. Description of the Related Art

The following descriptions and examples are not admitted to be prior art by virtue of their inclusion within this section.

Over the years, the use of microprocessors has become increasingly widespread in a variety of applications. Today, microprocessors may be found not only in computers, but may also be found in devices such as VCR's, microwave ovens, and automobiles. In some applications, such as microwave ovens, low cost may be the driving factor in the design of the microprocessor. On the other hand, other applications may demand the highest performance obtainable. For example, modem telecommunication systems may require very high speed processing of multiple signals representing voice, video, data, etc. Processing of these signals, which have been densely combined to maximize the use of available communication channels, may be rather complex and time consuming. With an increase in consumer demand for wireless communication devices, such real time signal processing requires not only high performance but also demands low cost. To meet the demands of emerging technologies, designers must constantly strive to increase microprocessor performance while maximizing efficiency and minimizing cost.

With respect to performance, greater overall microprocessor speed may be achieved by improving the speed of various related and unrelated microprocessor circuits and operations. As stated above, microprocessor speed may be extremely important in a variety of applications. As such, designers have evolved a number of speed-enhancing techniques and architectural features. Among these techniques and features may be the instruction pipeline, the use of cache memory, and the concept of prefetching.

A pipeline consists of a sequence of stages through which instructions pass as they are executed. In a typical microprocessor, each instruction comprises an operator and one or more operands. Thus, execution of an instruction is actually a process requiring a plurality of steps. In a pipelined microprocessor, partial processing of an instruction may be performed at each stage of the pipeline. Likewise, partial processing may be performed concurrently on multiple instructions in all stages of the pipeline. In this manner, instructions advance through the pipeline in assembly line fashion to emerge from the pipeline at a rate of one instruction every clock cycle.

The advantage of the pipeline may lie in performing each of the steps required to execute an instruction in such a simultaneous manner. However, to operate efficiently, a pipeline must remain full. If the flow of instructions into and out of the pipeline is disrupted, clock cycles may be wasted while the instructions within the pipeline may be prevented from proceeding to the next processing step. Prior to execution, the instructions may typically be stored in a memory device, such that instructions may be fetched into the pipeline by the microprocessor. However, access times for such memory devices may generally be much slower than the operating speed of the microprocessor. As such, instruction flow through the pipeline may be impeded by the length of time required to fetch instructions from memory (i.e. memory latency).

An obvious approach to the above problem may seem to simply use faster memory devices. Unfortunately, although faster memory devices may be available, they are typically more costly and may consume more power than conventional memory. In view of these disadvantages, the use of high-speed memory devices throughout the entire memory hierarchy may be infeasible. Thus, a more practical alternative for high performance microprocessors may be the use of cache memory.

Cache memory is a secondary memory resource that may be used in addition to the main memory, and generally consists of a limited amount of very high-speed memory. Since cache memory may be small relative to the main memory, cost and power consumption of the cache may not be significant factors in some applications. However, factors such as cost and circuit dimension limitations may place constraints on cache size in other applications.

Cache may memory improve microprocessor performance whenever the majority of instructions required by the microprocessor may be concentrated in a particular region of memory. The principle underlying the use of cache may be, more often than not, the microprocessor may fetch instructions from the same area of memory. Such a principle may be due to the sequential nature in which instructions may be stored in memory. In other words, most instructions may be executed by the microprocessor in the sequence in which they may be encountered in memory.

Assuming the majority of instructions required by the microprocessor may be found in a given area of memory, the entire area may be copied (e.g., in a block transfer) to the cache. In this manner, the microprocessor may fetch the instructions as needed from the cache rather than from the main memory. Since cache memory may be faster than main memory, the pipeline may be able to operate at full speed. Thus, cache memory may provide a dramatic improvement in average pipeline throughput. Such an improvement may be achieved by providing the pipeline with faster access to instructions than would be possible by directly accessing the instructions from conventional memory. As long as the instructions are reasonably localized, the use of a cache may significantly improve microprocessor performance.

To further improve access time to information, one or more levels of cache memory may also be included within the system. Typically, the lowest level of cache (i.e. the first to be accessed) may be smaller and faster than the one or more levels above the lowest level in the memory hierarchy. Also, the number of caches in a given memory hierarchy may vary. When an instruction is executed, the address associated with the instruction may typically be directed to the lowest level of cache. The fastest possible operation may be called a "cache hit." A cache hit may occur when the information corresponding to the instruction address may be stored in the level of cache indicated by the address. If a cache hit occurs, the addressed information may be retrieved from the cache without having to access a higher level of memory in the memory hierarchy. The higher ordered memory may be slower to access than the lower ordered cache memory.

Conversely, a "cache miss" may occur when an instruction required by the microprocessor is not present in the level of cache indicated by the instruction address. In response to a cache miss, the next higher ordered memory structure may be presented with the instruction address. The next higher ordered memory structure may be another cache, such that another hit or miss may occur. If misses occur at each level of cache, "starvation" of the microprocessor may occur. During starvation, the microprocessor may discard the contents of the cache. Subsequently, the necessary information may be fetched as quickly as possible from main memory and may be placed into cache. Obviously, this may be a source of overhead, and if it becomes necessary to empty and refill the cache frequently, system performance may begin to approach that of a microprocessor without cache.

Another advancement in microprocessor technology relates to the concept of prefetching information, where such information may either be data or instructions. A block of information may be prefetched from a storage device, which may be at a relatively high order in the memory hierarchy, and written to a storage device lower in the memory hierarchy, such as a lower order cache. Prefetching may allow the time spent to retrieve such information to occur concurrently with other actions of the microprocessor. In this manner, when the microprocessor requests the prefetched information, there may be little or no delay in having to fetch the information from a nearby cache. Thus, prefetching may reduce or eliminate some of the cache miss penalty by having such a miss occur while the microprocessor may be occupied with other processing.

Prefetching may involve a speculative retrieval of information, where the information may be retrieved from a higher level memory system, such as an external memory, and may be placed into a lower level memory system, such as a cache memory device. Such a retrieval may be executed under the expectation that the retrieved information may be needed by the microprocessor for an anticipated event at some point after the next successive clock cycle.

Several types of prefetching are known in the art. The most common instance of a prefetch may be performed in response to a load operation. A load may occur when the microprocessor requests specific information to be retrieved, such that the retrieved information may be used by the microprocessor. However, a store operation may prefetch a block of data, such that a portion of the block may be overwritten with current information. Still another form of prefetching may occur for certain instructions, such as those involved with certain block or string-related operations. In particular, such instructions may involve strings having numerous words, such as a double-word, or some other quantity. For example, the instruction may include a string having a double-word, yet the microprocessor is capable of handling only one word (or other quantity) at a time. In such a case, the microprocessor may fetch the first word of the string, while concurrently prefetching some or all of the remaining words of the string. Therefore, a prefetch may be performed so that the remaining words in the instruction are more readily accessible for processing after fetching the first word. Thus, prefetching instructions during such a time that the microprocessor may be occupied with other processing may increase the speed of the microprocessor by ensuring the availability of subsequent instructions before such instructions may be actually requested by the microprocessor.

Though prefetching, according to the manners described above, provides the benefit of improved microprocessor performance, the present inventors have recognized various drawbacks resulting from such techniques. Therefore, discussion of such drawbacks is presented below along with various embodiments that reduce the effects of such drawbacks and improve upon the prior art.

SUMMARY OF THE INVENTION

Instruction prefetching may be relatively straightforward in the case of linear programming code (i.e. code without discontinuities or branches). For example, the microprocessor may request an address of an instruction. Once the first cacheline of instructions arrives from the cache memory device, the microprocessor may begin executing the instruction, and at the same time, the prefetch unit may prefetch the next cacheline of instructions. If a cache miss occurs, the execution unit of the microprocessor may temporarily halt execution while the desired instruction may be fetched from main memory and placed into cache memory. In such a case, the occurrence of a cache miss may cause "starvation" of the microprocessor during the time it takes to fetch the missing instructions from memory. In addition, if the prefetch unit continues to fetch instructions during this time, the instructions may be fetched faster than the microprocessor may consume them. Therefore, it may be possible for the prefetch unit to "outlap" the microprocessor and overwrite instructions in the cache that have not yet been read by the microprocessor. Such a case may be avoided by at least temporarily halting the prefetch unit until the microprocessor may read the desired instructions.

However, an internal (i.e. on chip) cache is almost useless in linear code, since cache may only be needed when the instructions in the cache may be used repeatedly. Such repetitive use may be present, for example, in non-linear program code, which may imply that a backwards discontinuity may occur at some point. A very useful backwards discontinuity construct is the loop construct, which may execute a block of instructions a specified number of times. Since loop counts may be very large, it is judicious to avoid prefetching until a loop may be completed to avoid overwriting instructions in the loop that may still be needed. However, merely halting the prefetch unit until the microprocessor may read the current instruction (as described above in the case of linear code) may not be applicable in the case of non-linear code. For instance, even though a block of instructions contained within the loop may have been read, and are therefore fair game to be overwritten, the microprocessor may still need the loop instructions on a successive iteration of the loop.

As stated above, halting the prefetch unit may solve the problem of overwriting data not yet read by the microprocessor. For example, halting the prefetch unit may occur simply whenever the "Agn" statement is encountered in an assembly language program. However, resuming the prefetch process before a loop is terminated, such that the instructions immediately following the end of the loop are available as soon as the microprocessor exits the loop, may be a problem not addressed in current methods. Since current methods may not take into consideration the period of a loop iteration, the current methods cannot resume prefetching instructions precisely m cycles before the microprocessor exits a loop (i.e. where m may be the memory latency, or the number of clock cycles needed to fetch an instruction from memory). In this manner, though halting the prefetch unit may solve the problem of overwriting unread data, it may not solve the problem of microprocessor starvation.

Also stated above, starvation is said to occur whenever the microprocessor must wait to fetch an instruction from memory. In high-performance, real-time algorithms such as those used for signal processing applications, the impact of starvation may significantly reduce microprocessor performance. As such, current methods may attempt to solve the problem of starvation in one of two ways. In one embodiment, a current method may simply accept the m cycle penalty for exiting a loop. The disadvantage of accepting the m cycle penalty may surface when the execution time of a loop is not much longer than the memory latency (m). In this case, the effects of starvation may significantly affect microprocessor performance. For instance, if it takes 20 cycles to execute a loop and 4 cycles to fetch instructions from memory, there may be a 20% decrease in performance due to the effects of starvation.

In another embodiment, a current method may increase the size of the cache memory by a factor of m. In this manner, the increased size of the cache may allow a current method to prefetch the next m number of cache lines arranged after a loop, before prefetching may be halted during execution of the loop. As such, once the microprocessor exits the loop, there may be sufficient time to resume prefetching at cacheline m+1 without causing starvation. However, the disadvantages of increasing the size of the cache include increasing area as well as increasing cost.

The above outlined problems may be in large part addressed by an efficient method of instruction prefetching. Thus, the present invention contemplates a system and method for efficient instruction prefetching based on the termination of loops. The method for controlling a prefetch unit may include detecting when a set of instructions within a last iteration of a loop may be encountered. Prior to such detection, the method may disable the prefetch unit when a last instruction within a first iteration of the loop may be detected. The method for controlling the prefetch unit may further include counting a plurality of clock cycles needed to fetch the set of instructions within the loop by the prefetch unit. Such a number of clock cycles may be designated as the loop period. In addition, the method may enable the prefetch unit when a remaining number of clock cycles substantially equals the memory latency (m, or the number of clock cycles needed to access a memory device).

A computer system may also be contemplated herein. The computer system may include, but may not be limited to, a semiconductor memory device, a cache memory device and a prefetch unit. The system may also include a memory bus to couple the semiconductor memory device to the prefetch unit. In one embodiment, the prefetch unit may be included as an internal component of the microprocessor. In another embodiment, the prefetch unit may be included as an external component coupled to the microprocessor. The memory bus may be adapted to receive a sequence of instructions, which may include a first set of instructions followed by a second set of instructions, and may further receive/transmit a plurality of instruction sets. Furthermore, the computer system may also include a circuit coupled to the memory bus. The circuit may detect a branch instruction within the sequence of instructions, such that the branch instruction may target a loop construct. Such a loop construct may include a single set of instructions, or may also include a plurality of sets of instructions, such that the plurality of sets may be formed within one another and may create "nested" loops.

A circuit for controlling a prefetch unit may further be contemplated herein. The circuit may include a detector coupled to detect a loop within a sequence of instructions and to signal a loop count each time a set of instructions within the loop may be encountered. The circuit may also include a period counter coupled to the detector. The period counter may count a number of clock cycles associated with the set of instructions within a loop construct. In addition, a countdown timer may be coupled to the period counter, such that the countdown timer may be enabled to count down the number of clock cycles remaining in a loop. The period counter may initiate the enabling of the countdown timer, such that the period counter may indicate that a single iteration of the loop remains. Furthermore, the circuit may include a programmable logic component coupled to the countdown timer. The countdown timer may note when the number of clock cycles remaining in a loop may substantially equal the number of clock cycles needed to access a memory device. At such a time that the value of the countdown timer may substantially equal the memory latency value of the memory device, the countdown timer may signal the programmable logic component to enable the prefetch unit. In this manner, prefetching may be resumed m number of clock cycles before the microprocessor may exit the loop. As such, the m number of instructions arranged subsequent to the loop may be readily available for execution as soon as the microprocessor exits the loop.

BRIEF DESCRIPTION OF THE DRAWINGS

Other objects and advantages of the invention will become apparent upon reading the following detailed description and upon reference to the accompanying drawings in which.

Figure 1:
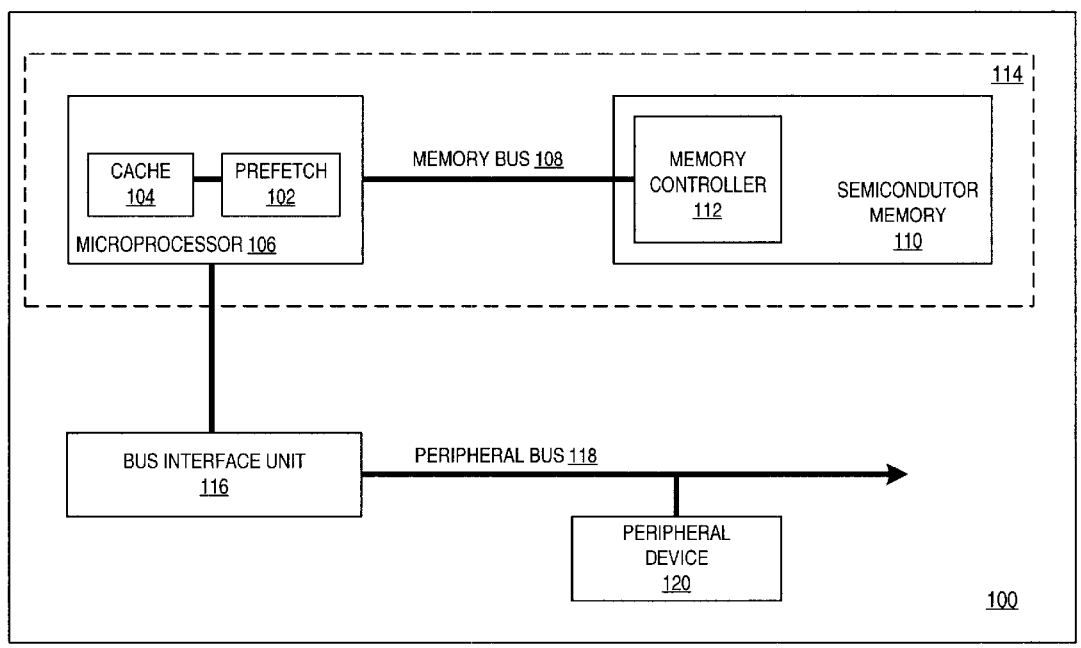
FIG. 1 is an embodiment of a typical computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

It will be appreciated to those skilled in the art having the benefit of this disclosure that this invention is believed to provide an efficient system and method for prefetching instructions based on loop periods. Such a system and method may eliminate problems, such as microprocessor starvation, while maintaining substantially small cache sizes and while substantially minimizing production costs.

FIG. 1 illustrates a block diagram of a microprocessor based computer system in accordance with the present embodiments. System 100 may include microprocessor 106 which may be coupled to memory device 110 via memory bus 108. Memory device 110 may include controller 112, such that communication may be controlled between the microprocessor and the memory device. As such, memory bus 108 may be adapted to receive a sequence of instructions from controller 112. Memory bus 108 may be further adapted to transmit a sequence of instructions to microprocessor 106. Microprocessor 106 may further be coupled to various peripheral devices via bus interface unit 116 and peripheral bus 118. For example, the peripheral device may be an external memory device, a printer, or an I/O device such as a keyboard. However, for the purpose of providing a context for the present embodiments, a single peripheral device 120 is illustrated in FIG. 1.

In one embodiment, microprocessor 106 may include an internal, or on-chip, cache memory device 104. An internal cache, often called a primary cache, may be built into the circuitry of the microprocessor. Microprocessor 106 may further include internal prefetch unit 102, such that the prefetch unit may be coupled to the internal cache memory device via an internal bus. In an alternative embodiment, cache 104 and prefetch unit 102 may be external devices coupled to microprocessor 106 via an external bus. The advantages and disadvantages of including internal versus external devices may be well known in the art; thus, internal devices are illustrated in FIG. 1 for the purpose of simplicity. Furthermore, the computer system may include a circuit (not shown) coupled to memory bus 108 for detecting a branch instruction within a sequence of instructions.

Figure 2:
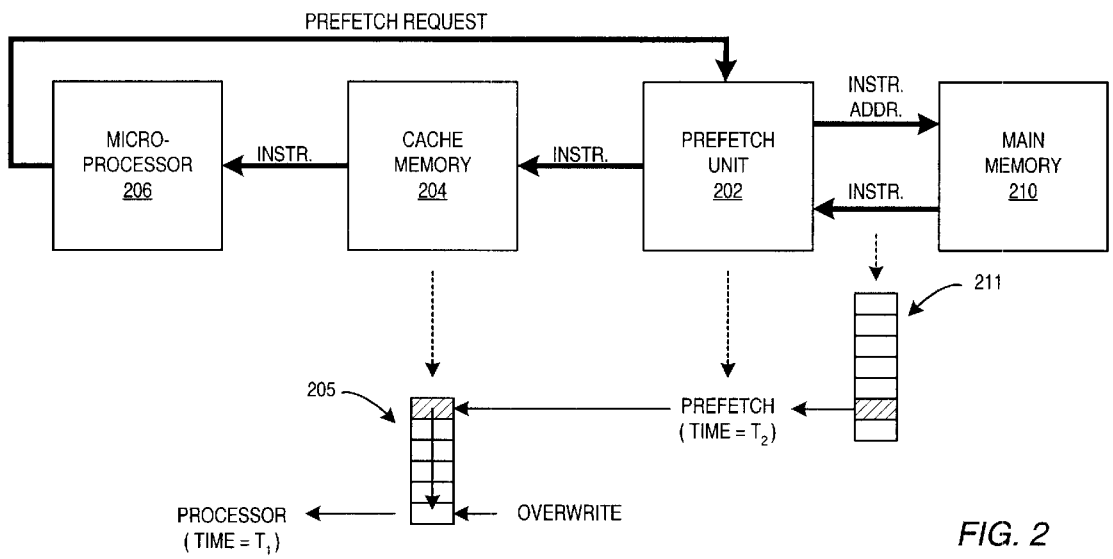
FIG. 2 is an embodiment of a system for prefetching instructions.

FIG. 2 is an embodiment of a system for prefetching instructions. As stated above, the concept of prefetching may involve a speculative retrieval of information, such that information may be retrieved from a higher level memory system and placed into a lower level memory system under the expectation that the retrieved information may soon be needed by the microprocessor. In this manner, prefetching may allow the time spent to retrieve such information to occur concurrently with other actions of the microprocessor. For example, during the time in which microprocessor 206 may be executing an instruction, prefetch unit 202 may retrieve a subsequent instruction from main memory 210 and may place the instruction in cache memory 204. The instruction may be available to microprocessor 206 on a subsequent clock cycle. As another example, prefetch unit 202 may retrieve a subsequent instruction from another external or higher ordered memory device, such as a floppy disk. The prefetch unit may locate the instruction within memory hierarchy 211 based on the instruction operand. Such an operand may include an address pointing to a location in memory hierarchy 211 where the instruction may be stored. Upon retrieving the desired instruction, prefetch unit 202 may "push" the instruction onto a higher level of cache memory hierarchy 205. Cache memory may be finite in size and may be divided into a finite number of elements. As such, pushing a prefetched instruction onto a higher level of cache may cause a ripple effect to filter throughout cache hierarchy 205. Such a ripple effect may cause each instruction in the hierarchy to be pushed down a level, such that the instruction located in the lowest level of cache may be "popped" out of the cache. Typically, the instruction popped out of the lowest level of cache may be the next instruction needed by the microprocessor. Therefore, prefetching instructions from higher ordered memory devices, such as main memory 210, and temporarily storing the instructions in lower ordered memory, such as cache memory 204, may allow a plurality of instructions to be available to the microprocessor. As such, the number of instructions available to the microprocessor may substantially equal the number of divided elements in cache memory 204.

In another embodiment, the current instruction required by the microprocessor may not be present in the level of cache indicated by the instruction address (i.e. a cache miss). In such a case, the microprocessor may wait for the desired information to be fetched from a higher ordered memory device. In the case of a cache miss, the execution unit of the microprocessor may temporarily halt execution while the desired instruction may be retrieved from a higher ordered memory device and placed into cache. As stated above, the occurrence of a cache miss may cause "starvation" of the microprocessor during the time it may take to fetch the missing instructions from memory. Also stated above, if the prefetch unit continues to fetch instructions during starvation of the microprocessor, the instructions may be fetched faster than the microprocessor may consume them. As shown in FIG. 2, for example, prefetch time $T_2$ may be faster than execution time $T_1$ due to such a microprocessor stall. Therefore, if prefetch unit 202 continues to push subsequent instructions onto cache memory hierarchy 205, a ripple effect may overwrite instructions in the lower levels of cache that may not have been read by microprocessor 206.

In the case of linear program code, the problem of overwriting unread data may be solved by temporarily halting prefetch unit 202, until microprocessor 206 may read the desired instructions. However, realistic code is almost never linear, and usually contains many backward discontinuities in the instruction flow. A very useful backwards discontinuity, or non-linear construct, is the loop construct. A loop may execute a block of instructions a specified number of times. Since loop counts may be very large, it is judicious to avoid prefetching until a loop may be completed to avoid overwriting instructions in the loop that may still be needed. Nonetheless, merely halting the prefetch unit until the microprocessor reads the current instruction (as described above in the case of linear code) may not be applicable in the case of non-linear program code. For instance, even though a block of instructions contained within the loop may have been read, and are therefore fair game to be overwritten, the microprocessor may still need the loop instructions on a successive iteration of the loop.

Figure 3:
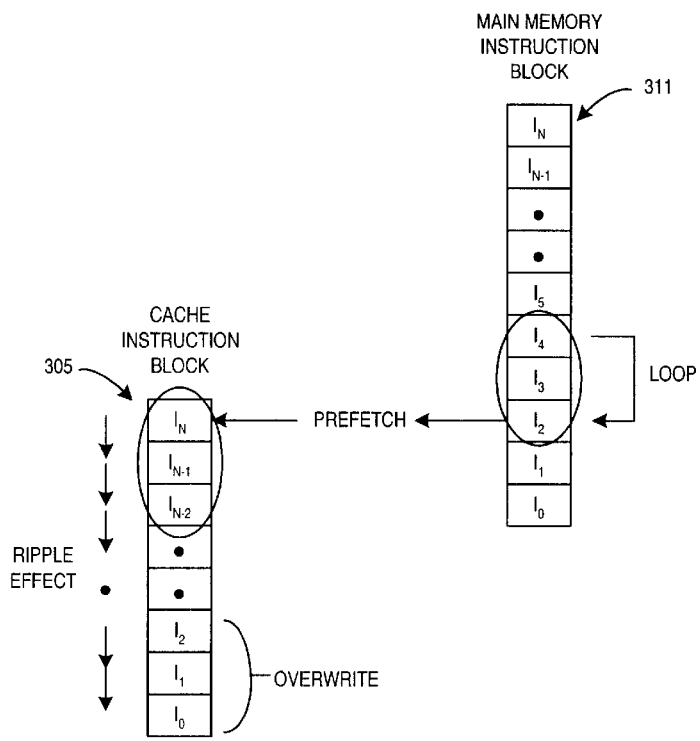
FIG. 3 illustrates how prefetching loop instructions may overwrite a plurality of unread instructions.

Therefore, the problem of overwriting unread data may be further complicated by the presence of non-linear program constructs, such as a loop construct. For example, FIG. 3 illustrates an embodiment of a method for prefetching loop instructions. As stated above, during the time in which the microprocessor may execute an instruction, the prefetch unit may retrieve a subsequent instruction from memory hierarchy 311. The prefetch unit may push the retrieved instruction onto cache hierarchy 305, such that the retrieved instruction may be available to the microprocessor on a subsequent clock cycle.

In such an example, instructions $I_2$, $I_3$ and $I_4$ may be contained within a loop construct. During a single iteration of the loop construct, loop instructions $I_2$, $I_3$ and $I_4$ may be retrieved from memory hierarchy 311 and may be placed into cache hierarchy elements $I_{N-2}$, $I_{N-1}$ and $I_N$, respectively. On a subsequent iteration of the loop construct, loop instructions $I_2$, $I_3$ and $I_4$ may be retrieved again from memory hierarchy 311 and placed again into cache hierarchy elements $I_{N-2}$, $I_{N-1}$ and $I_N$. As such, the instructions placed into cache memory in the previous loop iteration may be pushed to a lower level of cache during the current loop iteration. As a result, a block of instructions substantially equal to the number of instructions in the loop construct may be overwritten in the lower levels of cache for each iteration of the loop construct. Furthermore, this process may continue for a duration specified by the number of iterations of the loop construct. In this manner, the presence of a loop construct may sustain the ripple effect for a length of time sufficient to overwrite a plurality of unread instructions.

The problem in non-linear program code, however, may not lie in halting the prefetch unit after the first iteration of the loop. In assembly language, for example, this may occur whenever the "Agn" statement is encountered (see FIG. 4, line 8). Therefore, the problem in non-linear code may be how to resume prefetching before the end of a loop is encountered, such that instructions immediately following the end of the loop are available as soon as the microprocessor exits the loop.

Figures 4, 5:
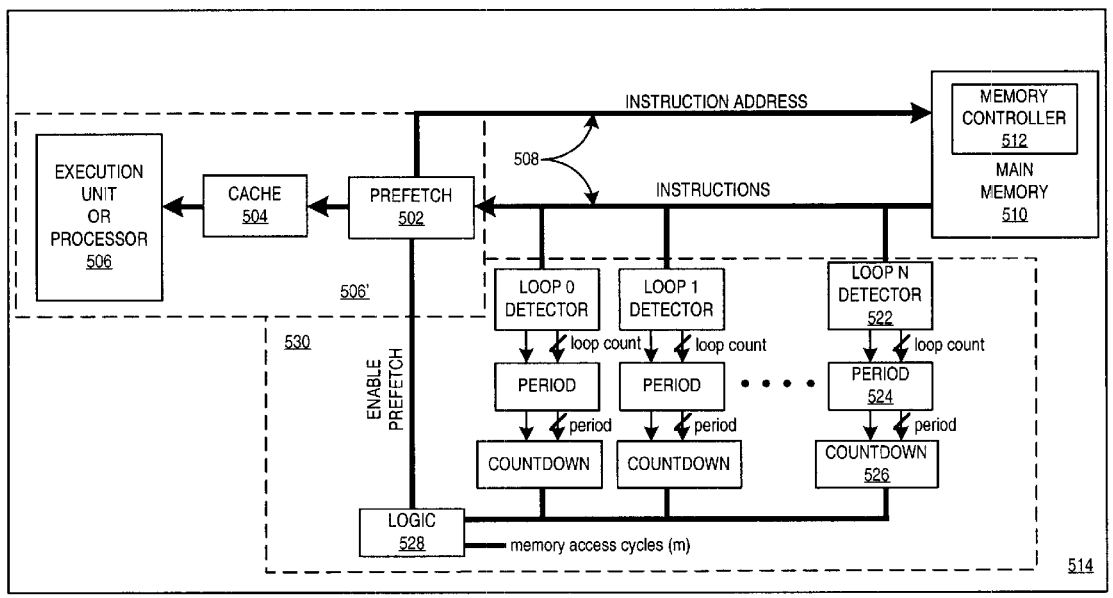
FIG. 4 is an assembly language representation of a program containing nested loops.
FIG. 5 is an embodiment of a system for prefetching instructions based on loop periods.

The problem may be especially challenging when nested loops are involved, as shown in FIG. 4. For example, knowing when to awaken from Loop0 to begin prefetching the instructions at line 9 may require knowledge of the number of clock cycles in a single iteration of Loop0 (n), as well as the number of clock cycles needed to access the memory device (m). The memory latency (m) may be different for different types of memory devices. Such memory devices may be either primary or secondary storage devices. Primary storage may be called online storage, since it may be directly accessible through the address lines of a microprocessor. In this manner, primary storage devices may have substantially fast access times, though may be limited in capacity as well as duration of storage time. On the other hand, secondary storage may be called mass storage and may maintain large amounts of information for a substantially long period of time. However, due to the physical size of secondary storage devices, the storage device may be held offline and may not be directly accessible by the microprocessor. For information in secondary storage to be available to the microprocessor, the information may be transferred from secondary storage into primary storage. As such, primary storage devices may have substantially shorter memory latency times, and thus may be substantially faster than secondary storage devices.

In addition, the number of clock cycles in a single iteration of Loop0 (n) may include not only the number of instructions in Loop0, but may also depend on the number of iterations of the loop nested within Loop0 (i.e. Loop1 in FIG. 4). In such a case, it may appear difficult to calculate the number of clock cycles in a single iteration of an outside loop (i.e. Loop0), and nearly impossible to obtain an answer within one clock cycle. Furthermore, the combination of a plurality of nested loops may further add to the complexity of the problem.

FIG. 5 illustrates an embodiment of a computer system for prefetching instructions based on loop periods. The system may solve the above problem using simple logic without the necessity of determining an answer in a single clock cycle. The system may include memory device 510, cache memory device 504, prefetch unit 502, and circuit 530. In one embodiment, cache memory 504 and prefetch unit 502 may be external devices coupled to microprocessor 506 via external buses. In another embodiment, cache memory 504 and prefetch unit 502 may be on-chip devices. As such, cache memory 504 and prefetch unit 502 may be coupled to the execution unit of microprocessor 506'. Thus, cache memory. 504 and prefetch unit 502 may be "hard-wired" into the circuitry of the microprocessor.

The system may further include memory bus 508 coupled between memory device 510 and prefetch unit 502. The memory bus may be adapted to receive a sequence of instructions, which may include a first set of instructions followed by a second set of instructions, and may further receive/transmit a plurality of instruction sets. For example, prefetch unit 502 may be coupled to memory controller 512, such that the prefetch unit may send an instruction address to the memory controller. Such an address may indicate the location in memory in which the desired instruction may be stored. Upon locating the desired instruction in memory, controller 512 may transmit the desired instruction to prefetch unit 502 via memory bus 508.

In addition, the computer system may also include circuit 530 coupled to memory bus 508. The circuit may detect a branch instruction within a sequence of instructions, such that the branch instruction may target a loop construct. Such a loop construct may include a single set of instructions, or may also include a plurality of instruction sets. The plurality of instruction sets may be arranged subsequent to one another, or may be formed within one another to create "nested" loops. In any case, circuit 530 may include detector 522 for detecting the presence of a loop construct. Loop detector 522 may be coupled to one or more counting components, such as period counter 524 and countdown timer 526. Period counter 524 may count the number of clock cycles associated with a first set of instructions to obtain a period count of the first set of instructions, or loop. The period count may be transferred to countdown timer 526, such that countdown timer 526 may count the number of clock cycles remaining during a last iteration of the loop. Countdown timer 526 may be further coupled to logic component 528. Logic component 528 may be coupled to prefetch unit 502, such that logic component 528 may control when prefetching may be resumed prior to the termination of the first set of instructions. Logic component 528 may further include a multiple input logic element to handle a plurality of loop constructs, either nested or sequentially arranged.

Figure 6:
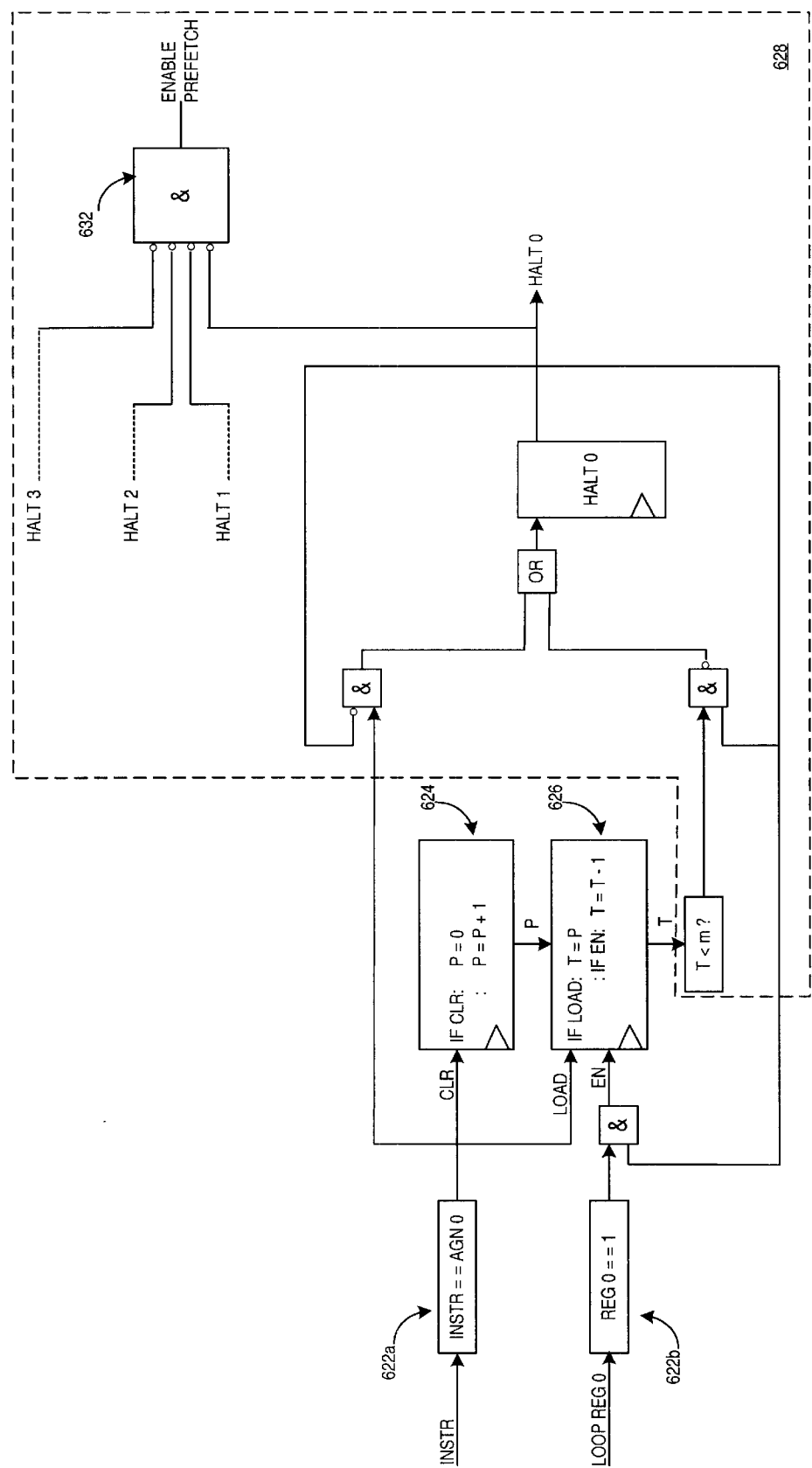
FIG. 6 is a logic diagram of an embodiment of a circuit for prefetching instructions based on loop periods.

FIG. 6 is a logic diagram of an embodiment of a circuit for prefetching instructions based on loop periods. As stated above, the circuit may include, but may not be limited to, a loop detector, a period counter, a countdown timer, and a logic component. The detector may include register component 622a, such that a sequence of a first set of instructions may be at least temporarily stored in register component 622a. Register component 622a may determine if the last instruction of the first set of instructions is detected (i.e. the first occurrence of the Agn0 statement in the example of an assembly language program). The register component may be coupled to a first counting device. The first counting device may be period counter 624, as described above, and may include a latching component. Register component 622a may detect a last instruction of the first set of instructions, and in such a case, the period count of period counter 624 may be set equal to zero. The period count may be incremented after each successive clock cycle until a subsequent loop may be detected by register component 622a. At such a time, the period count may be re-initialized to zero, and a new count may begin to obtain the period count of a second set of instructions.

The loop detector may further include register component 622b, such that a sequence of values that may be substantially equal to the number of clock cycles associated with a first set of instructions may be at least temporarily stored in register component 622b. Register component 622b may detect a last iteration of the first set of instructions (i.e. if the number of iterations remaining in the loop equals 1). Register component 622b may be coupled to a second counting device. The second counting device may be countdown timer 626, as described above, and may include a latching component. Countdown timer 626 may be further coupled to register component 622a and period counter 624. In this manner, register component 622a may detect the last instruction of the first set of instructions (i.e. first loop), and in such a case, the period count associated with the first set of instructions may be loaded from period counter 624 into countdown timer 626. At the same time, register component 622b may detect a last iteration of the first set of instructions. In such a case, register component 622b may enable countdown timer 626 to count down the remaining clock cycles within the last iteration of the first set of instructions.

In addition, the circuit may also include logic component 628. Logic component 628 may include one or more latching components and may also include a plurality of comparison components. As such, logic component 628 may enable the prefetch unit if the number of clock cycles needed to fetch the remaining instructions of the first set of instructions is substantially equal to the latency of the memory device in which the instructions may be stored (i.e. latency, m=number of clock cycles needed to access instructions from memory).

For example, turning to FIG. 6, if the value of the countdown timer (T) is not less than the memory latency (m) AND if prefetching has not previously been suspended, then logic component 628 may disable the prefetch unit. Logic component 628 may also continue to disable the prefetch unit during subsequent iterations of the loop prior to the last iteration of the loop. On the other hand, if the value of the countdown timer (T) is less than or equal to the memory latency (m) AND if prefetching has been previously suspended, then logic component 628 may enable the prefetch unit (i.e. in the current example, Halt 0 signal may be enabled) to resume prefetching instructions succeeding the loop. In this manner, the prefetch unit may be enabled to resume prefetching at a time substantially equal to the latency of the memory device (i.e. prefetching enabled at substantially T=m).

As another embodiment, the circuit may also include multiple input logic gate 632, such that each input of the logic gate may be coupled to a replica of the circuit described above. For example, signals Halt 1, Halt 2 and Halt 3 may be coupled to circuits substantially similar to the circuit coupled to signal Halt 0. In such an embodiment, the circuit may control the prefetching of instructions in non-linear programming code having one or more nested loops based on the loop periods of one or more nested loops.

Figure 7:
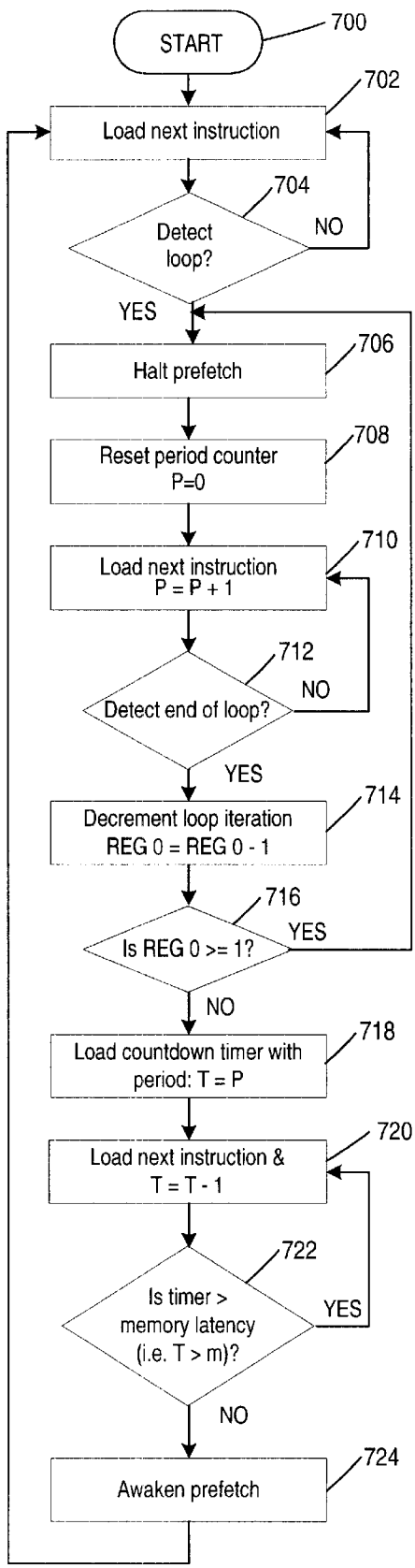
FIG. 7 is a flow chart of an embodiment of a method for prefetching instructions based on loop periods.

Furthermore, FIG. 7 is a flow chart diagram of an embodiment of a method for prefetching instructions based on loop periods. In the context of the present embodiments, the term a "set of instructions" may be hereinafter described as a loop for the sake of simplicity. As described above, it should also be noted that though the present embodiments may be illustrated as including a "first set of instructions" or a first loop, a plurality of loops arranged either serially or in combination with one another to form nested loops, may also be included in the scope of the current invention.

Such a method may include detecting a first set of instructions (i.e. loop) by detecting the occurrence of a last instruction within a first iteration of the loop (step 704). In the assembly language program code of FIG. 4, for example, a first loop may be detected by the occurrence of the "Agn0" statement. Prior to detection of a first loop, one or more instructions in the program code may be executed (steps 700, 702). Upon detecting an occurrence of a first loop, the prefetch unit may be disabled, such that the prefetch unit may be at least temporarily suspended from prefetching subsequent instructions from memory (step 706). Concurrently, a period counter may be set to zero (step 708) and may be incremented upon loading an instruction of a subsequent iteration of the first loop (step 710).

The method may also include detecting a last iteration of a first loop. For example, the loaded instruction may not be the last instruction of an iteration of the first loop (step 712). In such an example, a subsequent instruction may be loaded and the period counter may be incremented (step 710) until a last instruction of the first loop may be detected. In other words, the period counter may count the number of instructions within a single iteration of the first loop. As another example, the loaded instruction may be the last instruction of an iteration of the first loop (step 712). In such an example, the number of iterations of the first loop may be decremented (step 714). Upon detecting a last instruction, the number of iterations of the first loop may be substantially greater than one (step 716). In such a case, the prefetch unit may continue to be disabled, while steps 706 through 716 of the method may be repeated for a subsequent iteration of the loop. On the other hand, a set of instructions within a last iteration of the first loop may be detected when the number of iterations of the first loop may be substantially equal to one (step 716). In such a case, a value representing the number of clock cycles within a single iteration of the first loop (i.e. the loop period) may be transferred from the period counter to the countdown timer (step 718).

As such, the method may also include counting down a plurality of clock cycles remaining in a last iteration of the loop. For instance, after loading the loop period into the countdown timer, the timer may be decremented after each clock cycle of the last iteration of the loop (step 720). Furthermore, the method may include enabling the prefetch unit when a remaining number of clock cycles substantially equals a number of clock cycles need to access a memory device. In other words, the value in the countdown timer may be substantially less than or equal to the latency of a memory device (i.e. T≦m). In such a case, the prefetch unit may be enabled (step 724), such that prefetching may be resumed (step 702) and an instruction subsequent to the loop may be prefetched from an external memory device and may be placed into cache. On the other hand, the value in the countdown timer may be substantially greater than the latency of a memory device (i.e. T>m). In this case, a subsequent instruction of the last iteration of the loop may be loaded and the countdown timer may be decremented. During such a time, the prefetch unit may continue to be disabled.

Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A circuit for controlling a prefetch unit, comprising:
    a detector coupled to detect a loop within a sequence of instructions and to signal a loop count each time a set of instructions within the loop are, encountered;
    a period counter coupled to the detector for counting a number of clock cycles associated with the set of instructions;
    a countdown timer coupled to the period counter for counting down the number of clock cycles when the loop count indicates only one of the set of instructions remain; and logic coupled to the countdown timer for enabling the prefetch unit whenever the countdown number of clock cycles substantially equals a number of clock cycles needed to access a memory device.

2. The circuit as recited in claim 1, wherein the detector is coupled to receive the sequence of instructions forwarded from the memory device to a cache memory device.

3. The circuit as recited in claim 1, wherein the loop count is decremented each time a set of instructions of the loop are encountered and, when the loop count indicates an absence of any remaining said set of instructions, the loop is exited to the next instruction within the sequence of instructions subsequent to the loop.

4. The circuit as recited in claim 1, wherein the logic is coupled to disable the prefetch unit at all times during which the set of instructions within the loop are encountered up to a time in which the number of clock cycles substantially equals the number of clock cycles needed to access the memory device.

5. The circuit as recited in claim 4, wherein the prefetch unit is prevented from forwarding instructions from the memory device to a cache memory device during times when the prefetch unit is disabled.

6. The circuit as recited in claim 4, wherein the prefetch unit forwards instructions from the memory device to a cache memory device during times when the prefetch unit is enabled.

7. The circuit as recited in claim 1, wherein the number of clock cycles needed to access the memory device is pre-defined depending on the type of said memory device.

8. The circuit as recited in claim 1, wherein the number of clock cycles needed to access the memory device is programmed depending on the type of said memory device.

9. A computer, comprising:
   a memory device;
   a cache memory device;
   a prefetch unit;
   a bus coupled between the memory device and the prefetch unit, wherein the bus is adapted to receive a sequence of instructions comprising a first set of instructions followed by a second set of instructions; and
   a circuit coupled to the bus for detecting a branch instruction within the sequence of instructions and a loop targeted by the branch instruction, wherein the circuit disables the prefetch unit from fetching the second set of instructions from the memory device to the cache memory device during times when the first set of instructions are at least partially contained within the loop, and wherein the circuit enables the prefetch unit to fetch the second set of instructions from the memory device to the cache memory device during times when a number of clock cycles needed to fetch a remaining subset of the first set of instructions are substantially equal to a plurality of clock cycles needed to access the memory device by the prefetch unit.

10. The computer as recited in claim 9, wherein the circuit comprises:
    a detector coupled to a first counter, and wherein the detector is coupled to a second counter;
    a period counter coupled to the detector for counting a number of clock cycles associated with the first set of instructions, wherein the period counter comprises the first counter, wherein the first counter comprises a latching component, wherein the latching component sets the period counter equal to zero when the last instruction of an iteration of the first set of instructions is detected; and
    a countdown timer coupled to the detector for counting the number of clock cycles when the loop indicates only one of the set of first instructions remain, wherein the countdown timer comprises the second counter, wherein the second counter comprises a latching component, wherein the latching component comprises loading a value of the first counter into the second counter when a last instruction of the first set of instructions is detected,
    and wherein the latching component comprises decrementing the second counter when the first instruction of the last iteration of the first set of instructions is detected.

11. The computer as recited in claim 10, wherein the detector comprises placing a sequence of the first set of instructions in a register component, wherein the register determines if the last instruction of the first set of instructions is detected.

12. The computer as recited in claim 10, wherein the detector comprises placing a value that is equal to the number of clock cycles associated with the first set of instructions in a register component, wherein the register determines if the last iteration of the first set of instructions is detected.

13. The computer as recited in claim 9, wherein the circuit comprises a logic component, wherein the logic component comprises a latching component and a plurality of comparison components to enable the prefetch unit if the number of clock cycles needed to fetch the remaining subset of the first set of instructions is substantially equal to the plurality of clock cycles needed to access the memory device by the prefetch unit.

14. The computer as recited in claim 9, wherein the circuit comprises a logic component, wherein the logic component comprises a latching component and a plurality of comparison components to disable the prefetch unit if the number of clock cycles needed to fetch the remaining subset of the first set of instructions is substantially greater than the plurality of clock cycles needed to access the memory device by the prefetch unit.

15. The computer as recited in claim 9, wherein the circuit is coupled to a multiple input logic element, wherein each input of the logic element is coupled to a distinct circuit for determining the termination of a distinct set of instructions, wherein the logic element may disable the prefetch unit if the number of clock cycles needed to fetch the remaining subset of the first set of instructions is substantially greater than the plurality of clock cycles needed to access the memory device and if the remaining inputs to the logic element comprising subsequent sets of instructions are disabled, and wherein the logic element may enable the prefetch unit if the number of clock cycles needed to fetch the remaining subset of the first set of instructions is substantially equal to the plurality of clock cycles needed to access the memory device and if the remaining inputs to the logic element comprising subsequent sets of instructions are enabled.

16. A method for controlling a prefetch unit, comprising:

detecting when a set of instructions within a last iteration of a loop is encountered;

counting a plurality of clock cycles needed to fetch the set of instructions by the prefetch unit; and enabling the prefetch unit when the remaining number of the clock cycles substantially equals a number of clock cycles needed to access a memory device.

17. The method as recited in claim 16 further comprising disabling the prefetch unit prior to said detecting when a last instruction within a first iteration of the loop is encountered.

18. The method as recited in claim 16, wherein said detecting comprises noting the last iteration of the loop as a loop count number equals one.

19. The method as recited in claim 18, wherein said counting comprises noting the clock cycles needed to fetch the set of instructions within the loop having a loop count equal to one.

20. The method as recited in claim 16, wherein said enabling comprises signaling the prefetch unit to resume prefetch of instructions from a memory device to a cache memory.

* * * * *